(12) United States Patent
Barile et al.

(10) Patent No.: US 11,306,760 B2
(45) Date of Patent: Apr. 19, 2022

(54) NON-ROTATING T-NUT AND SCREW CATCH FOR USE IN A CHAIR PANEL AND METHOD FOR USING THE SAME

(71) Applicant: Daniel Paul Chairs, LLC, Morristown, TN (US)

(72) Inventors: Peter W. Barile, Morristown, TN (US); Todd Edward Helm, Morristown, TN (US)

(73) Assignee: Daniel Paul Chairs, LLC, Morristown, TN (US)

( * ) Notice: Subject to any disclaimer, the term of this patent is extended or adjusted under 35 U.S.C. 154(b) by 380 days.

(21) Appl. No.: 16/526,492

(22) Filed: Jul. 30, 2019

(65) Prior Publication Data

US 2019/0353193 A1  Nov. 21, 2019

Related U.S. Application Data

(62) Division of application No. 15/478,527, filed on Apr. 4, 2017, now abandoned.

(51) Int. Cl.

| | |
|---|---|
| *F16B 37/00* | (2006.01) |
| *F16B 19/10* | (2006.01) |
| *F16B 12/30* | (2006.01) |
| *F16B 13/00* | (2006.01) |
| *F16B 5/06* | (2006.01) |

(Continued)

(52) U.S. Cl.
CPC .......... *F16B 19/1081* (2013.01); *F16B 12/30* (2013.01); *F16B 13/001* (2013.01); *A47B 2230/0037* (2013.01); *F16B 5/0225* (2013.01); *F16B 5/065* (2013.01); *F16B 9/052* (2018.08); *F16B 21/073* (2013.01); *F16B 37/0878* (2013.01)

(58) Field of Classification Search
CPC ...... F16B 5/05; F16B 5/0225; F16B 37/0871; F16B 37/0878; F16B 37/0892; F16B 5/025; F16B 12/30
USPC ....................................................... 411/437
See application file for complete search history.

(56) References Cited

U.S. PATENT DOCUMENTS

| | | | | |
|---|---|---|---|---|
| 781,571 A | * | 1/1905 | Thomas | F16B 37/02 |
| | | | | 411/437 |
| 1,925,689 A | * | 9/1933 | Dietrich | F16B 37/0878 |
| | | | | 249/213 |

(Continued)

FOREIGN PATENT DOCUMENTS

EP           1610006         12/2005

*Primary Examiner* — Flemming Saether
(74) *Attorney, Agent, or Firm* — Pitts & Lake, P.C.

(57) ABSTRACT

An oval-shaped T-nut that is received within an oval receiver machined into the upholstered panel to be secured to a chair frame is provided. The oval shape of the T-nut prevents the oval-shaped T-nut from rotating when a screw is driven into the T-nut. Further, this eliminates the necessity of stapling the traditional plastic T-nut to the chair panel, thus saving time and money associated with the manufacture of an upholstered metal frame chair. In addition to the oval-shaped T-nut described herein, a novel U-shaped screw catch is also provided which cooperates with a barbed nylon or plastic push rivet to secure the upholstered chair panels to one another. Further, a method for connecting upholstered seat back panels to the tabs positioned on the back frame of a chair, utilizing the T-nut and the screw catch is disclosed.

22 Claims, 7 Drawing Sheets

(51) Int. Cl.
*F16B 9/00* (2006.01)
*F16B 21/07* (2006.01)
*F16B 5/02* (2006.01)
*F16B 37/08* (2006.01)

(56) References Cited

U.S. PATENT DOCUMENTS

| | | |
|---|---|---|
| 2,085,804 A | 7/1937 | Heimann |
| 2,102,554 A | 12/1937 | Churchill |
| 2,172,461 A * | 9/1939 | Whitescarver ...... E04G 17/0658 |
| | | 411/435 |
| 2,985,213 A | 5/1961 | Consandine |
| 3,348,596 A | 10/1967 | Kajetan |
| 3,386,757 A | 6/1968 | Forward |
| 3,434,521 A | 3/1969 | Flora |
| 4,460,299 A | 7/1984 | Kowalski |
| 4,784,554 A | 11/1988 | Break |
| 4,810,143 A | 3/1989 | Muller |
| 4,919,578 A | 4/1990 | Zeigler |
| 4,948,313 A | 8/1990 | Zankovich |
| 4,957,402 A | 9/1990 | Klein |
| 4,978,261 A * | 12/1990 | Wright, III ........... B23Q 16/001 |
| | | 408/241 S |
| 4,981,405 A | 1/1991 | Kato |
| 4,984,926 A | 1/1991 | Harley |
| 5,046,904 A | 9/1991 | Malinow |
| 5,074,731 A * | 12/1991 | Schneider ............... F16B 37/08 |
| | | 411/437 |
| 5,193,961 A | 3/1993 | Hoyle |
| 5,199,836 A | 4/1993 | Gogarty |
| 5,209,619 A | 5/1993 | Rinderer |
| 5,297,851 A | 3/1994 | Van Hekken |
| 5,429,467 A | 7/1995 | Gugle |
| 5,502,926 A | 4/1996 | Grace |
| 5,517,788 A | 5/1996 | McGough |
| 5,738,476 A | 4/1998 | Assimakopoulos |
| 6,648,412 B2 | 11/2003 | Moradell |
| 6,854,943 B2 | 2/2005 | Nagayama |
| 7,654,782 B2 | 2/2010 | Nilsen |
| 7,674,081 B2 | 3/2010 | Selle |
| 7,731,464 B2 | 6/2010 | Nagayama |
| 8,267,630 B2 | 9/2012 | Moon |
| 8,413,939 B2 * | 4/2013 | Ramsauer ................. E05C 9/22 |
| | | 248/226.11 |
| 8,485,910 B2 | 7/2013 | Selle |
| 8,505,186 B2 | 8/2013 | van Hekken |
| 8,672,597 B2 | 3/2014 | Selle |
| 8,764,117 B2 | 7/2014 | van Hekken |
| 9,066,595 B2 | 6/2015 | Kumazawa |
| 9,976,591 B2 | 5/2018 | Lambert |
| 10,030,685 B2 * | 7/2018 | Berton ................... F16B 37/00 |
| 2006/0083601 A1 | 4/2006 | Moerke |
| 2006/0182513 A1 | 8/2006 | Dortch |
| 2007/0041806 A1 | 2/2007 | Wahls |
| 2009/0080998 A1 | 3/2009 | Nagayama |
| 2012/0189382 A1 | 7/2012 | Health |

* cited by examiner

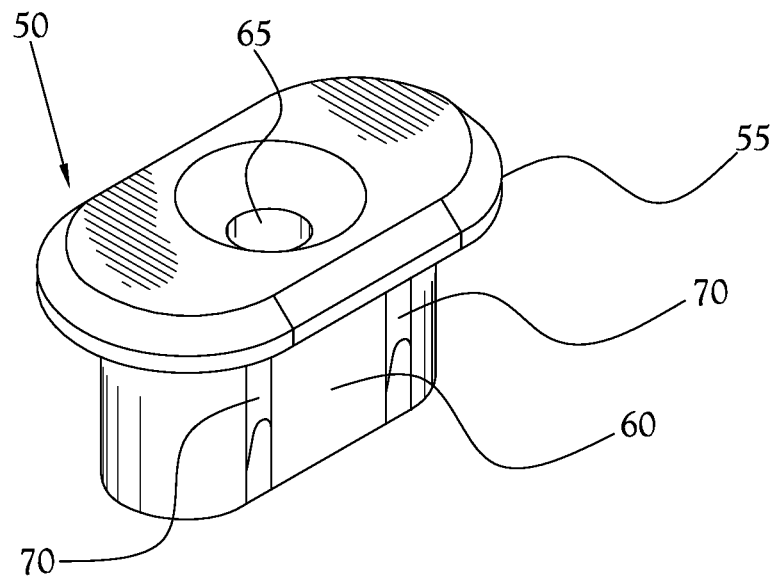
Fig.2A
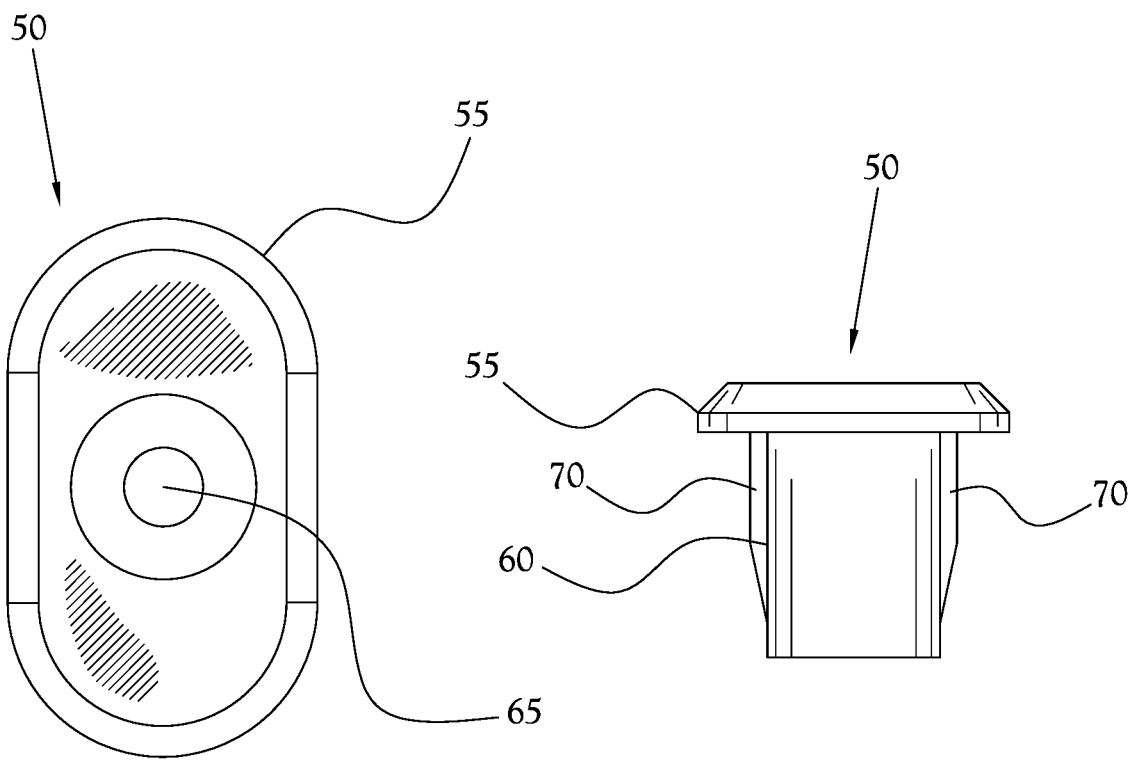
Fig.2B
Fig.2C

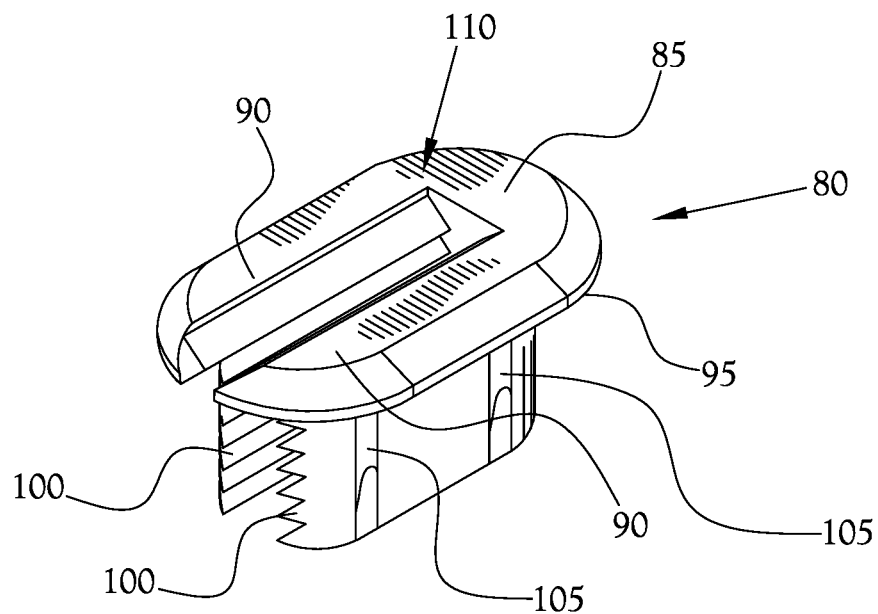
Fig.3A
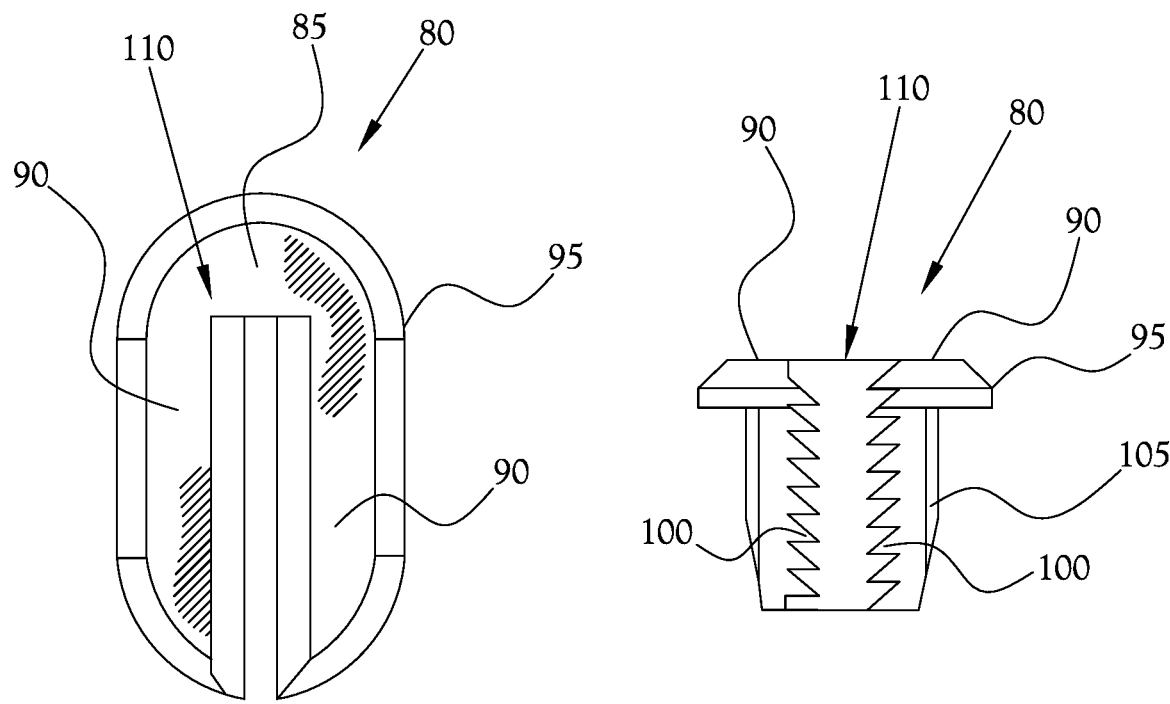
Fig.3B
Fig.3C

NON-ROTATING T-NUT AND SCREW CATCH FOR USE IN A CHAIR PANEL AND METHOD FOR USING THE SAME

CROSS-REFERENCE TO RELATED APPLICATIONS

This application claims the benefit of U.S. patent application Ser. No. 15/478,527, filed on Apr. 4, 2017, which is incorporated herein in its entirety by reference.

STATEMENT REGARDING FEDERALLY SPONSORED RESEARCH OR DEVELOPMENT

Not Applicable

BACKGROUND OF THE INVENTION

1. Field of Invention

The invention relates to an improved T-nut, a U-shaped screw catch for use in securing two upholstered chair panels to one another, and a method for using the same. More particularly, it relates to an oval-shaped T-nut which is tightly received in an oval-shaped receiver, for preventing the T-nut from rotating within the chair panel as a screw is threadably received by the T-nut. The U-shaped screw catch is adapted to receive a nylon or plastic barbed push rivet.

2. Description of the Related Art

In the field of chair manufacturing, especially metal frame chair manufacturing, it is known to have upholstered chair panels, particularly within the chair back, supported by and secured to the chair frame. One such chair is illustrated in U.S. Design Pat. No. D433,836, which was invented by the inventor of the present invention. In chairs of this design, and to achieve a more desirable aesthetic effect, the back consists of an upholstered inside panel and an upholstered outer panel. Typically, the inside panel is secured to tabs secured to the back frame and the outer panel is then secured to the inside panel. These upholstered panels, secured to one another in this fashion, conceal the hardware used to secure the back panels to the chair frame and to one another. It is known, and will be understood by those skilled in the art, that typically the inside panel is constructed of oriented strand board, OSB. Receivers are provided in the inside panel which receive T-nuts which are then aligned, or registered, with the tabs in the back support of the metal frame chair. Plastic T-nuts are typically used which accept a sheet metal type screw. The screw then cuts its own treads into the plastic material as the screw is driven in by powered screw drivers. This action creates high torque pressure on the plastic T-nut. In order to prevent the plastic T-nut from spinning within the receiver as the screw is driven, the plastic T-nut is typically stapled to the OSB. If the plywood has a soft spot in the area of the staple, the T-nut will spin; and the screw will not tighten all the way down. This may then require the chair component to be disassembled and repaired, which results in delay and additional expense. Additionally, the step of stapling the T-nut to the OSB requires additional materials and represents an additional step in the manufacturing process. What is missing in the art is a T-nut designed to prevent rotation within its receiver in the OSB as a screw is driven into the T-nut. Accordingly, one of the express objects of the present is to provide an improved T-nut adapted to prevent rotation.

BRIEF SUMMARY OF THE INVENTION

In order to prevent the traditional T-nut, such as is typically utilized in the manufacture of the upholstered panels of a metal frame chair, from spinning while a screw is driven into it, the present invention provides an oval-shaped T-nut that is received within an oval receiver machined into the upholstered first seat back panel, referred to herein as the inside panel, which is secured to a chair frame. Further, this eliminates the necessity of stapling the traditional plastic T-nut to the chair panel, thus reducing materials and eliminating a manufacturing step, thus saving time and money associated with the manufacture of an upholstered metal frame chair.

In addition to the oval-shaped T-nut described herein, a novel U-shaped screw catch is also provided. The U-shaped screw catch is received within an oval receiver machined into one of the upholstered panels, preferably the inside panel, the and is adapted to receive and engage the corresponding barbs or threads on a nylon or plastic push rivet which projects from the other upholstered chair panel. The combination of the push rivet and the U-shaped screw catch serve to secure the upholstered chair panels to one another.

BRIEF DESCRIPTION OF THE SEVERAL VIEWS OF THE DRAWINGS

The above-mentioned features of the invention will become more clearly understood from the following detailed description of the invention read together with the drawings in which:

FIG. 2A is a perspective view of the oval-shaped T-nut of the present invention;

FIG. 2B is a top plan view of the oval-shaped T-nut of the present invention;

FIG. 2C is an end elevation view of the oval-shaped T-nut of the present invention;

FIG. 3A is a perspective view of the U-shaped screw catch of the present invention;

FIG. 3B is a top plan view of the U-shaped screw catch of the present invention;

FIG. 3C is an end elevation view of the U-shaped screw catch of the present invention;

DETAILED DESCRIPTION OF THE INVENTION

Figure 1:
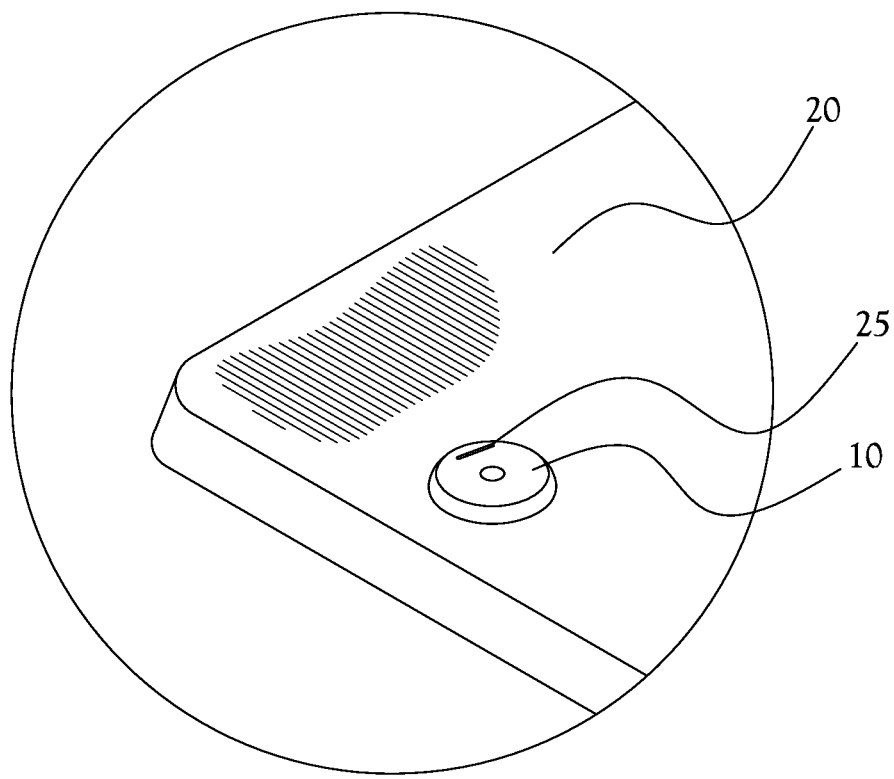
FIG. 1 is a plan view of a prior art T-nut used in the traditional method of assembling the back of an upholstered metal frame chair.
Figure 5:
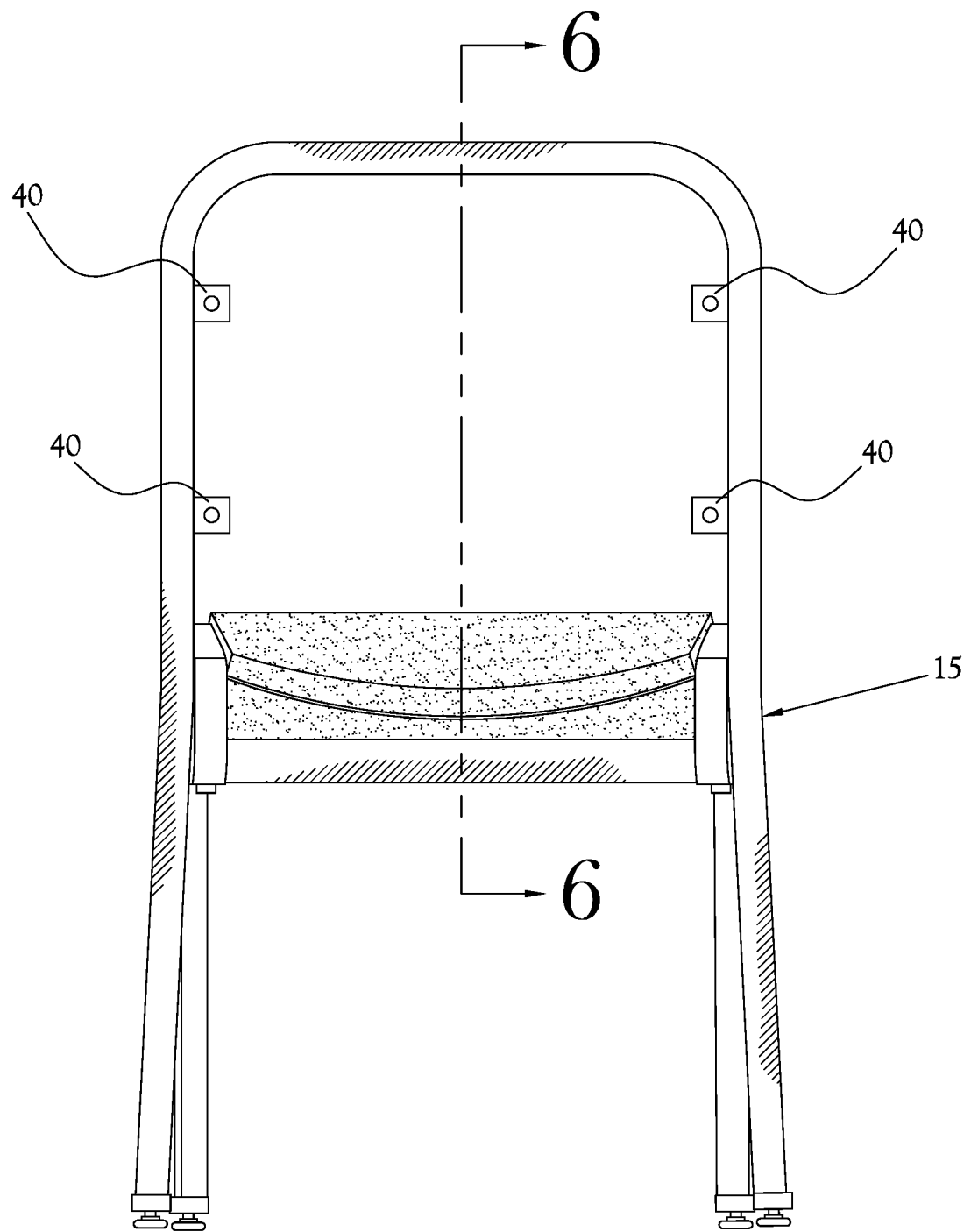
FIG. 5 is a rear elevation view of the metal frame upholstered chair illustrated in FIG. 5 having the back panels removed for clarity of view.

FIG. 1 illustrates a traditional prior art T-nut 10 utilized in the manufacture of the upholstered seat back panels of a frame chair 15, especially a metal frame chair. While such upholstered panels are found in both the vertical seat back portion and the horizontal seat support section portion of metal frame chair 15, the present description makes specific reference to the inside seat back panel 20 and the outside seat back panel 30 that make up the upholstered back portion of metal frame chair 15 illustrated in FIG. 5. Plastic T-nuts, such as traditional T-nut 10, in this field are typically used with a sheet metal type screw 35. The screw 35 cuts its own treads into the plastic material as the screw 35 is driven into traditional T-nut 10 by powered screw drivers. This action creates high torque pressure on the plastic T-nut 10. In order to prevent the plastic T-nut 10 from spinning as the screw 35 is driven, the plastic T-nut 10 is typically stapled with staple 25 to the inside panel 20.

Figure 4A:
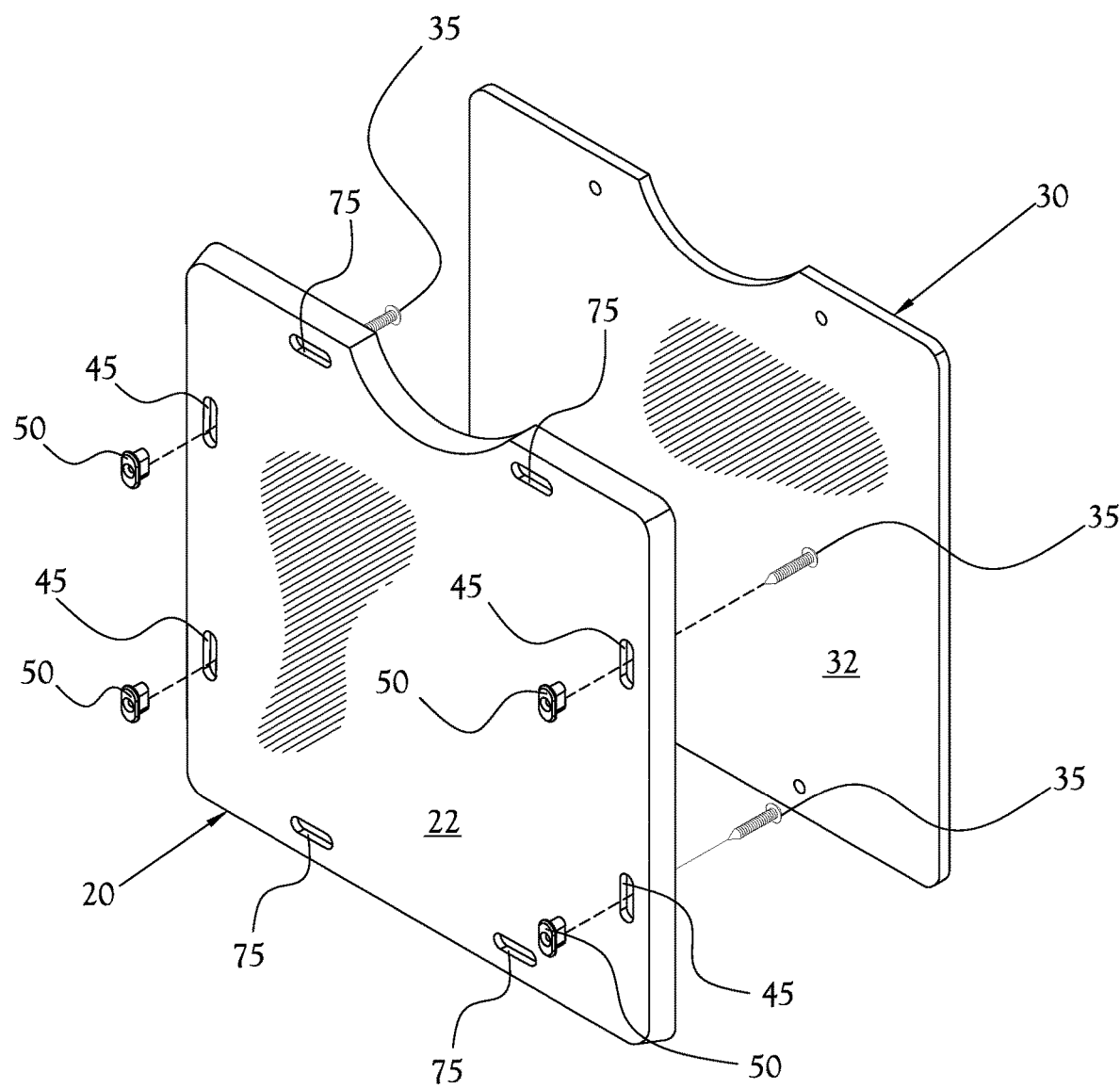
FIGS. 4A and 4B are an exploded perspective views of the inside back panel and outside back panel with the oval-shaped T-nut and U-shaped screw catch of the present invention.
Figure 4B:
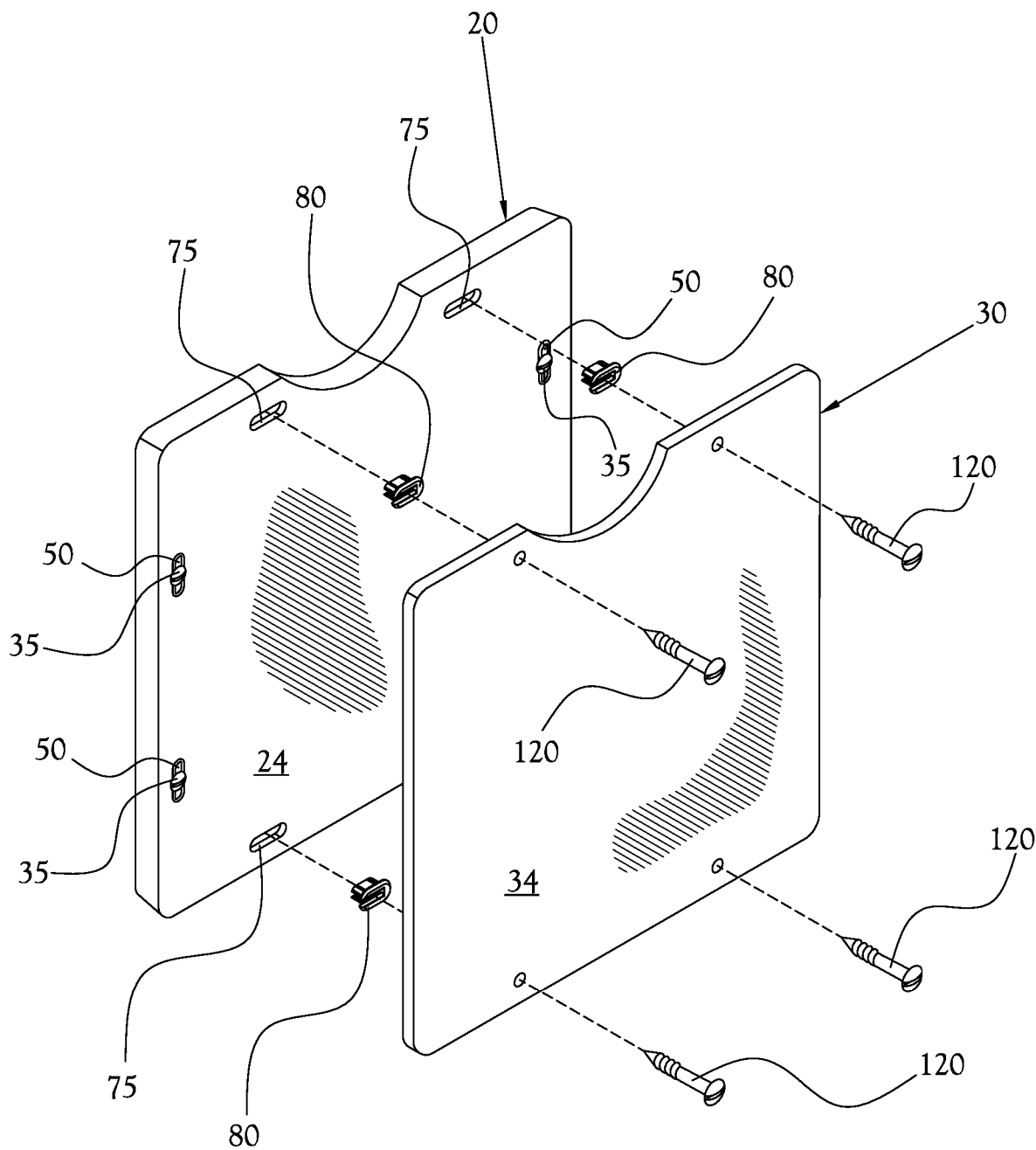

Referring to FIGS. 2 and 4, an exemplary embodiment oval-shaped T-nut 50 is provided. In an exemplary embodiment, oval-shaped T-nut 50 is constructed from plastic. Oval-shaped T-nut 50 includes an oval-shaped flange 55 and an oval-shaped barrel 60 projecting therefrom. Oval-shaped barrel 60 is received by oval receiver 45 which is machined into inside panel 20. Oval-shaped flange 55 engages the distal surface 22 of the inside panel 20.

Additionally, a bore member 65 extends longitudinally through both the oval-shaped flange 55 and the oval-shaped barrel 60. Bore member 65 is adapted to receive screw 35 and is dimensioned with respect to screw 35 such that screw 35 cuts threads into the barrel member 65 as the screw 35 is driven into bore member 65. The oval-shaped T-nut 50 and oval receiver 45 are dimensioned such that the oval-shaped barrel 60 of oval-shaped T-nut 50 is received and secured into oval receiver 45 in a press-fit, tight frictional engagement. In an exemplary embodiment, a plurality of rib members 70 are disposed on the oval-shaped barrel 60 which are adapted to provide this tight frictional engagement between oval-shaped T-nut 50 and oval receiver 45.

In addition to the oval receivers 45 described above, further oval receivers 75 are provided in selected locations along the periphery of inside panel 20. Oval receivers 75 are adapted to receive screw catch 80, illustrated in FIG. 3, of the present invention. Screw catch 80, in an exemplary embodiment, is U-shaped. As used herein, the U-shape is defined by a U-shaped barrel 110 having a shoulder portion 85 and first and second stem portions 90 projecting from said shoulder portion. Similar to the oval-shaped T-nut 50 described above, screw catch 80 includes a U-shaped flange 95 projecting from the U shaped barrel 110. In an exemplary embodiment, first and second stems 90 are substantially parallel to one another. Further projecting from the inside surface of first and second stems 90 are a plurality of fins or ridges 100, which, as will be described in greater detail below, are adapted to engage corresponding barbs, or threads, on a nylon or plastic push rivet 120. Similar to the oval-shaped T-nut described above, U-shaped screw catch 80 and oval receiver 75 are dimensioned such that the U-shaped barrel 110 of U-shaped screw catch 80 is received and secured into oval receiver 75 in a press-fit, tight frictional engagement. In an exemplary embodiment, a plurality of rib members 105 are disposed on the U-shaped barrel 110 which are adapted to provide this tight frictional engagement between U-shaped screw catch 80 and oval receiver 75.

Figure 6:
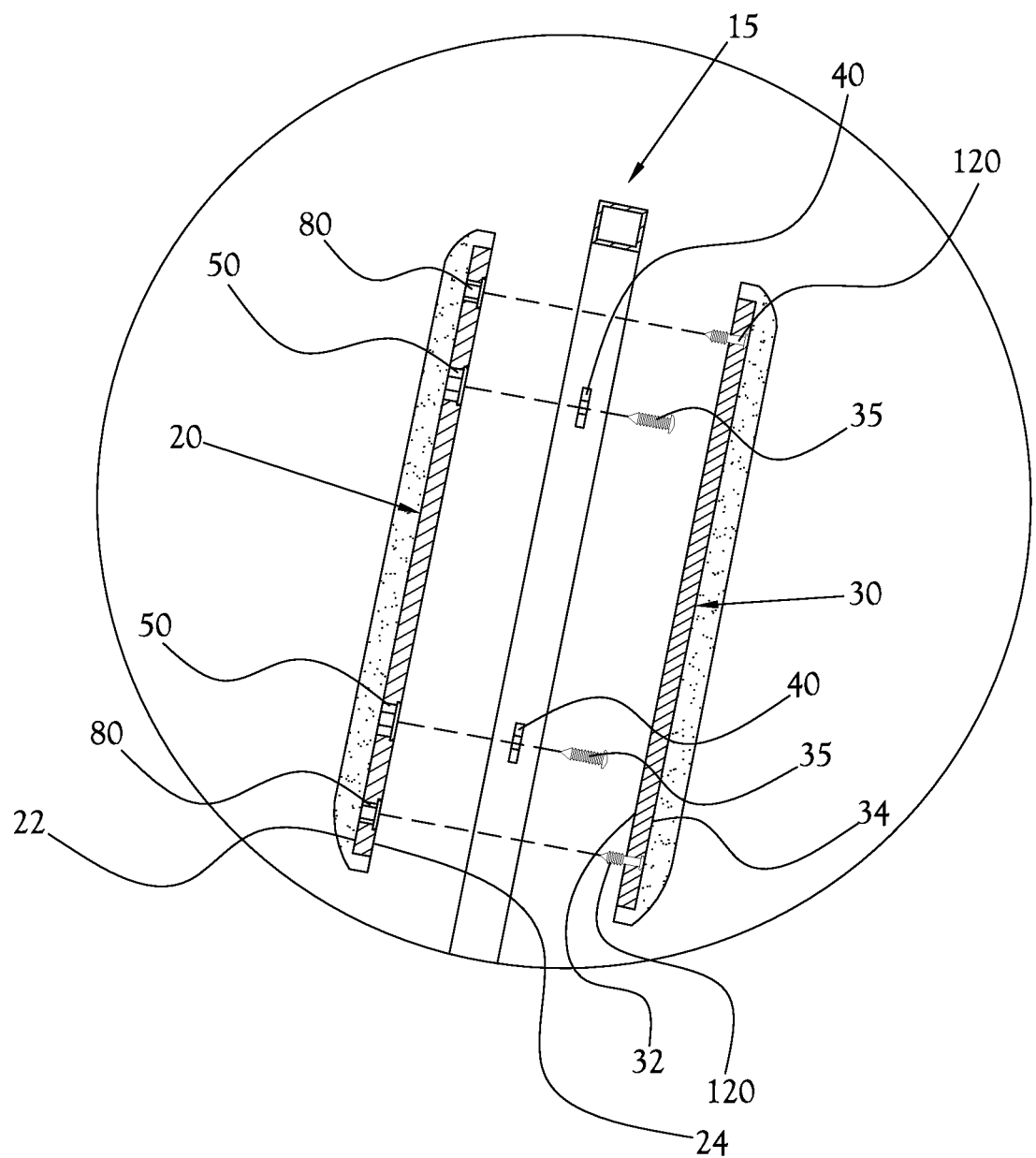
FIG. 6 is an exploded partial side cross-sectional view of the metal frame upholstered chair illustrated in FIG. 5.

Referring to FIGS. 6 and 7, installation of the inside panel 20 and outside panel 30, and use of the oval-shaped T-nut 50 and U-shaped screw catch 80 of the present invention will be described. In metal frame chairs, such as chair 15, the back portion consists of an upholstered inside panel 20 and an upholstered outside panel 30. Those skilled in the art will recognize that inside panel 20 is secured to a plurality of tabs 40 secured to the back frame of metal frame chair 15. Inside panel 20 has a first, or distal, surface 22 facing away from tabs 40 and a second, or proximal, surface 24 facing towards and proximal to tabs 40. Outside panel 30 has a first, or proximal, surface 32 facing towards, and proximal to, tabs 40 and a second, or distal, surface 34 facing away from tabs 40. It should be understood that, as used herein, the terms "proximal" and "distal" are used to describe the various surfaces in relation to tabs 40. Thus, the proximal surfaces are the surfaces nearest the tabs while the distal surfaces are the surfaces away from tabs 40. The terms proximal and distal are used to describe the surfaces of inside panel 20 and outside panel 30 in terms of which surfaces are close to or away from the tabs 40 respectively. In this regard, oval receivers 45 are machined into inside panel 20 so as to register with hole members provided in tabs 40. Oval-shaped T-nut 50 is pressed into oval receiver 45 and is oriented such that the oval-shaped flange 55 engages the distal surface 22. In an exemplary embodiment, threaded fasteners, such as screws 35, are inserted through the hole members provided in tabs 40 and into the bore member 65 provided in oval-shaped T-nut 50. Screws 35 are tightened, cutting threads into the oval-shaped T-nut 50 as described herein. As the screws 35 are tightened, the oval-shaped flange 55 acts against the distal surface 22 of inside panel 20 pulling inside panel 20 tightly against tabs 40; and the inside panel 20 is secured to the back portion of the metal frame of chair 15.

Nylon or plastic push rivets 120 are inserted through outside panel 30, in a manner that will be readily understood by those skilled in the art. In an exemplary embodiment, push rivets 120 are barbed. Push rivets 120 are selectively spaced about the periphery of outside panel 30 so as to register with the U-shaped screw catches 80, received within oval receivers 75 provided along the periphery of the inside panel 20 as described above. The linear space defined between the first and second stems 90 of U-shaped screw catches 80 provides for a greater margin of error for alignment of the push rivets 120 and U-shaped screw catches 80 than is allowed by the conventional hole members that would be traditionally provided. As the outside panel 30 is brought into position, such that the push rivets 120 align with the U-shaped screw catches 80, the outside panel 30 is then pressed towards inside panel 20, forcing the push rivets into the U-shaped screw catches 80. The barbs provided on the shank of push rivet 120 engage with the ridges 100 of the U-shaped screw catch 80 so as to lock the push rivet 120 into a tight frictional engagement with U-shaped screw catch 80, so as to secure outside panel 30 to inside panel 20. In an exemplary embodiment, the U-shaped flange 95 of the U-shaped screw catch 80 engages the proximal surface 24 of the inside panel 20 and keeps the U-shaped screw catch 80 from being pushed out of oval receiver 75 as outside panel 30 is being pushed into engagement with inside panel 20. While a barbed nylon or plastic push rivet 120 is described herein, it will be appreciated by those skilled in the art that a nylon or plastic threaded screw could be utilized such that the threads of the screw engage the ridges 100 of the U-shaped screw catch 80.

While the present invention has been illustrated by description of several embodiments and while the illustrative embodiments have been described in detail, it is not the intention of the applicant to restrict or in any way limit the scope of the appended claims to such detail. Additional modifications will readily appear to those skilled in the art. The invention in its broader aspects is therefore not limited to the specific details, representative apparatus and methods, and illustrative examples shown and described. Accordingly, departures may be made from such details without departing from the spirit or scope of applicant's general inventive concept.

Having thus described the aforementioned invention, what is claimed is:

1. A U-shaped screw catch for use in assembling a chair, said U-shaped screw catch comprising:
   a U-shaped barrel wherein said U-shaped barrel is defined by a shoulder portion and first and second stem portions;
   a U-shaped flange projecting from said U-shaped barrel;
   a plurality of ridges projecting from an inner surface of said first and second stem portions, wherein said ridges are adapted to engage with ridges disposed on a surface of a push rivet; and
   a plurality of rib members disposed on an exterior surface of said first and second stem portions of said U-shaped barrel.

2. The U-shaped screw catch for use in assembling a chair of claim 1 wherein said U-shaped barrel of said U-shaped screw catch is adapted to be received by an oval receiver, wherein said U-shaped screw catch and said oval receiver are dimensioned such that said U-shaped barrel is received within and secured into said oval receiver in a press-frit, tight frictional engagement.

3. In a frame chair having back frame, a plurality of tabs selectively positioned on said back frame and upholstered seat back panels, a method for connecting a first upholstered seat back panel to the tabs positioned on the back frame and for connecting a second upholstered seat back panel to the first upholstered seat back panel, said method comprising:
   providing a hole member in each of said tabs;
   providing a plurality of oval-shaped T-nuts having an oval-shaped flange, an oval-shaped barrel projecting from said oval-shaped flange and a bore member adapted to receive a self-tapping screw, said bore member extending longitudinally through both said oval-shaped flange and said oval-shaped barrel;
   providing a plurality of U-shaped screw catches having a U-shaped flange and a U-shaped barrel projecting from said U-shaped flange, said U-shaped barrel defining a shoulder portion and first and second stem portions projecting from said shoulder portion, said first and second stem portions being substantially parallel to one another and having a plurality of ridges projecting from an inner surface of said first and second stem portions;
   providing a first seat back panel;
   providing a second seat back panel;
   machining a first plurality of oval receivers in said first seat back panel, wherein said each of said first plurality of oval receivers is adapted to receive an oval-shaped T-nut in a press-fit, tight frictional engagement;
   disposing an oval-shaped T-nut in each of said first plurality of oval receivers in a press-fit, tight frictional engagement;
   machining a second plurality of oval receivers in said first seat back panel, wherein each of said second plurality of oval receivers is adapted to receive a U-shaped screw catch in a press-fit, tight frictional engagement;
   disposing a U-shaped screw catch in each of said second plurality of oval receivers in a press-fit, tight frictional engagement;
   securing said first seat back panel to said plurality of tabs by inserting a threaded fastener through said hole member provided in each of said tabs and into said bore member in said oval-shaped T-nut;
   inserting plurality of push rivets through said second seat back panel such that each of said plurality of push rivets registers with one of said U-shaped screw catches disposed in said first seat back panel; and
   pressing said second seat back panel towards said first seat back panel thereby forcing said push rivets into said U-shaped screw catches, whereby said second seat back panel is secured to said first seat back panel.

4. The method of claim 3 wherein said U-shaped flange of said U-shaped screw catch engages a proximal surface of said first seat back panel thereby preventing said U-shaped screw catch from being pushed out of said oval receiver as said second seat back panel is being pushed into engagement with said first seat back panel.

5. The method of claim 3 wherein said oval-shaped T-nut is oriented with respect to said first seat back panel such that said oval-shaped flange engages an distal surface of said first seat back panel, whereby as said threaded fasteners are tightened said oval-shaped flange acts against said distal surface of said first seat back panel pulling said first seat back panel tightly against said tabs.

6. The method of claim 3 wherein said threaded fasteners are machine screws and said bore member is dimensioned with respect to said machine screw such that said machine screw cuts threads into said barrel member as said machine screw is rotatably driven into said bore member.

7. The method of claim 3 wherein said oval-shaped T-nut is manufactured of plastic and further wherein said U-shaped screw catch is manufactured of plastic.

8. The method of claim 3 wherein said oval-shaped T-nut further has a plurality of rib members disposed on said oval-shaped barrel.

9. The method of claim 3 wherein said U-shaped screw catch further has a a plurality of rib members disposed on said U-shaped barrel.

10. The method of claim 3 wherein said first and said second seat back panels are each upholstered.

11. The method of claim 3 wherein said push rivet is threaded.

12. The method of claim 3 wherein said push rivet is barbed.

13. A U-shaped screw catch for use in assembling a chair, said U-shaped screw catch comprising:
   a U-shaped barrel, wherein said U-shaped barrel is defined by a shoulder portion and first and second stem portions;
   a U-shaped flange projecting from said U-shaped barrel;
   wherein said U-shaped barrel is adapted to be received by an oval receiver, wherein said U-shaped screw catch and said oval receiver are dimensioned such that said U-shaped barrel is received within and secured into said oval receiver in a press-frit, tight frictional engagement; and
   a plurality of ridges projecting from an inner surface of said first and second stem portions, wherein said ridges are adapted to engage with ridges disposed on a surface of a push rivet.

14. The U-shaped screw catch of claim 13 wherein said U-shaped screw catch further comprises a plurality of rib members disposed on an exterior surface of said first and second stem portions of said U-shaped barrel.

15. In a frame chair having back frame, a plurality of tabs selectively positioned on said back frame and upholstered seat back panels, a method for connecting a first upholstered seat back panel to the tabs positioned on the back frame and for connecting a second upholstered seat back panel to the first upholstered seat back panel, said method comprising:

providing a hole member in each of said tabs;
providing a plurality of oval-shaped T-nuts having an oval-shaped flange, an oval-shaped barrel projecting from said oval-shaped flange and a bore member adapted to receive a self-tapping screw, said bore member extending longitudinally through both said oval-shaped flange and said oval-shaped barrel;
providing a plurality of U-shaped screw catches, each said U-shaped screw catch having a U-shaped barrel, wherein said U-shaped barrel is defined by a shoulder portion and first and second stem portions, wherein said U-shaped screw catch further has a U-shaped flange projecting from said U-shaped barrel, wherein said U-shaped screw catch further has a plurality of ridges projecting from an inner surface of said first and second stem portions, wherein said ridges are adapted to engage with ridges disposed on a surface of a push rivet; and a plurality of rib members disposed on an exterior surface of said first and second stem portions of said U-shaped barrel;
providing a first seat back panel;
providing a second seat back panel;
machining a first plurality of oval receivers in said first seat back panel, wherein said each of said first plurality of oval receivers is adapted to receive an oval-shaped T-nut in a press-fit, tight frictional engagement;
disposing an oval-shaped T-nut in each of said first plurality of oval receivers in a press-fit, tight frictional engagement;
machining a second plurality of oval receivers in said first seat back panel, wherein each of said second plurality of oval receivers is adapted to receive a U-shaped screw catch in a press-fit, tight frictional engagement;
disposing a U-shaped screw catch in each of said second plurality of oval receivers in a press-fit, tight frictional engagement;
securing said first seat back panel to said plurality of tabs by inserting a threaded fastener through said hole member provided in each of said tabs and into said bore member in said oval-shaped T-nut;
inserting plurality of push rivets through said second seat back panel such that each of said plurality of push rivets registers with one of said U-shaped screw catches disposed in said first seat back panel; and
pressing said second seat back panel towards said first seat back panel thereby forcing said push rivets into said U-shaped screw catches, whereby said second seat back panel is secured to said first seat back panel.

16. The method of claim 15 wherein said U-shaped flange of said U-shaped screw catch engages a proximal surface of said first seat back panel thereby preventing said U-shaped screw catch from being pushed out of said oval receiver as said second seat back panel is being pushed into engagement with said first seat back panel.

17. The method of claim 15 wherein said oval-shaped T-nut is oriented with respect to said first seat back panel such that said oval-shaped flange engages a distal surface of said first seat back panel, whereby as said threaded fasteners are tightened said oval-shaped flange acts against said distal surface of said first seat back panel pulling said first seat back panel tightly against said tabs.

18. The method of claim 15 wherein said threaded fasteners are machine screws and said bore member is dimensioned with respect to said machine screw such that said machine screw cuts threads into said barrel member as said machine screw is rotatably driven into said bore member.

19. The method of claim 15 wherein said oval-shaped T-nut is manufactured of plastic and further wherein said U-shaped screw catch is manufactured of plastic.

20. The method of claim 15 wherein said first and said second seat back panels are each upholstered.

21. The method of claim 15 wherein said push rivet is threaded.

22. The method of claim 15 wherein said push rivet is barbed.

* * * * *